(12) United States Patent
Yang

(10) Patent No.: US 11,229,036 B2
(45) Date of Patent: Jan. 18, 2022

(54) COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 264 days.

(21) Appl. No.: 16/502,830

(22) Filed: Jul. 3, 2019

(65) Prior Publication Data
US 2019/0327748 A1 Oct. 24, 2019

Related U.S. Application Data

(63) Continuation of application No. PCT/CN2017/070187, filed on Jan. 4, 2017.

(51) Int. Cl.
*H04W 72/10* (2009.01)
*H04W 72/04* (2009.01)

(52) U.S. Cl.
CPC ......... *H04W 72/10* (2013.01); *H04W 72/042* (2013.01); *H04W 72/044* (2013.01)

(58) Field of Classification Search
CPC ... H04W 72/042; H04W 72/10; H04W 72/04; H04W 72/044
(Continued)

(56) References Cited

U.S. PATENT DOCUMENTS

2014/0119198 A1* 5/2014 Lee .................. H04L 1/1812
370/241
2016/0113008 A1 4/2016 Damnjanovic et al.
(Continued)

FOREIGN PATENT DOCUMENTS

CN 103686689 A 3/2014
CN 104540236 A 4/2015
(Continued)

OTHER PUBLICATIONS

LG Eectroncs, ZTE, Sharp, MTI, R1-168550; WP on Supporting URLLC in NR.
(Continued)

*Primary Examiner* — Rownak Islam
(74) *Attorney, Agent, or Firm* — Ladas & Parry LLP

(57) ABSTRACT

Embodiments of the present application provide a communication method, a terminal device and a network device. The method includes: starting, by a terminal device, a preconfigured timer; and monitoring, by the terminal device, resource preemption indication information transmitted by a network device in a preconfigured target frequency monitoring area within a duration of the timer, where the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic. The embodiments of the present application can inform a terminal device of a preempted eMBB resource flexibly within a duration of a timer by using the resource preemption indication information.

20 Claims, 6 Drawing Sheets

---

210 — A terminal device starts a preconfigured timer

220 — The terminal device monitors resource preemption indication information transmitted by a network device in a preconfigured target frequency monitoring area within a duration of the timer, where the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic

(58) Field of Classification Search
USPC .......................................................... 370/330
See application file for complete search history.

(56) References Cited

U.S. PATENT DOCUMENTS

| | | | |
|---|---|---|---|
| 2016/0269212 A1 | 9/2016 | Vilaipornsawai et al. | |
| 2019/0297638 A1* | 9/2019 | Park | H04W 72/042 |
| 2019/0349795 A1* | 11/2019 | Park | H04W 24/08 |

FOREIGN PATENT DOCUMENTS

| | | |
|---|---|---|
| CN | 105634703 A | 6/2016 |
| CN | 105684488 A | 6/2016 |
| CN | 105979597 A | 9/2016 |
| CN | 106231614 A | 12/2016 |
| CN | 106231677 A | 12/2016 |
| CN | 106255215 A | 12/2016 |
| EP | 3565304 A1 | 8/2020 |
| JP | 2012109954 A | 6/2012 |
| RU | 2016118482 A | 11/2016 |
| TW | I429235 B | 3/2014 |
| WO | 2005076652 A1 | 8/2005 |
| WO | WO2018126364 | 8/2020 |

OTHER PUBLICATIONS

Ericsson, R1-1613527; Summary of offline discussion on multiplexing of eMBB and URLLC traffic.
The first Office Action of corresponding Russian application No. 2019124520, dated Jun. 2, 2020.
International Search Report (ISR) dated Aug. 24, 2017 for Application No. PCT/CN2017/070187.
The first Office Action of comresponding Canadian application No. 3049273, dated Aug. 7, 2020.
Extended European Search Report dated Nov. 20, 2019; Appln No. 17889866.4.
Intel Corporation:"Uplink URLLC and eMBB multiplexing options", R1-1612582 (3GPP); Mobile Competence Centre; 650, Route Des Lucioles; F-06921 Sophia-Antipolis Cedex; France, vol. RAN WG1, No. Reno, USA; Nov. 14, 2016-Nov. 18, 2016; Nov. 6, 2016; XP051190855.
Intel Corporation:"UL URLLC transmission schemes", R1-1612004 (3GPP); Mobile Compeience Centre; 650, Route Des Lucioles; F-06921 Sophia-Antipolis Cedex; France, vol. RAN WG1, No. Reno, USA; Nov. 14, 2016-Nov. 18, 2016; Nov. 13, 2016; XP051175968.
Fujistsu:"DL control channel related to multiplexing eMBB and URLLC", R1-1611465 (3GPP); Mobile Competence Centre; 650, Route Des Lucioles; F-06921 Sophia-Antipolis Cedex; France, vol. RAN NG1, No. Reno, USA; Nov. 14, 2016-Nov. 18, 2016; Nov. 4, 2016; XP051189078.
The first Office Action of corresponding Japanese application No. 2019-536497, dated Jan. 19, 2021.
Sony, Dynamic Resourc Sharing for eMBB/URLLC in DL, 3GPP TSG-RAN WG1#87 R1-1611545, 3GPP, Nov. 4, 2016.
The first Office Action of corresponding Indian application No. 261917031165, dated Feb. 8, 2021.
The First Office Action of corresponding Chinese application No. 201780082378.2, dated Mar. 11, 2020.
The First Office Action of corresponding Chilean application No. 201901856, dated May 22, 2020.
The Notice of Allowance of corresponding Taiwan application No. 106144941, dated Apr. 29, 2021.
The First Office Action of corresponding Israeli application No. 267840, dated Jun. 28, 2021.
The first Office Action of corresponding Indonesian application No. PID201906745, dated Oct. 5, 2021.
The first Office Action of corresponding Australian application No. 2017391784, dated Sep. 29, 2021.

* cited by examiner

COMMUNICATION METHOD, TERMINAL DEVICE, AND NETWORK DEVICE

CROSS-REFERENCE TO RELATED APPLICATIONS

This application is a continuation of the International Application No. PCT/CN2017/070187, filed on Jan. 4, 2017, entitled "COMMUNICATION METHOD, TERMINAL DEVICE, AND NETWORK DEVICE", the content of which is incorporated herein by reference in its entirety.

TECHNICAL FIELD

Embodiments of the present application relates to the field of communications, and more specifically, to a communication method, a terminal device, and a network device.

BACKGROUND

With the development of mobile communication technologies, in the fifth generation (5G) mobile communication systems, in order to improve efficiencies of resource utilization, some traffic that requires low latency communication, for example, an ultra-reliable low latency communication (URLLC) traffic can preempt a resource originally allocated to enhanced mobile broad band (eMBB) traffic for data transmission. Therefore, how to indicate that the resource originally allocated to the eMBB traffic is preempted by other traffic so as to reduce the impact on the eMBB traffic is a problem that needs to be studied.

SUMMARY

The present application provides a communication method, a terminal device, and a network device to indicate a preempted eMBB resource.

A first aspect provides a communication method, the method includes: starting, by a terminal device, a preconfigured timer; and monitoring, by the terminal device, resource preemption indication information transmitted by the network device in a preconfigured target frequency monitoring area within a duration of the timer, where the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic.

The other traffic herein may be traffic that requires low latency communication, for example, URLLC traffic.

A terminal device can determine whether an eMBB resource of the terminal device is preempted by other traffic by monitoring resource indication information in a duration of a timer, so that an avoiding measure can be made by the terminal device in a case that an eMBB resource is preempted. Furthermore, the terminal device only monitors indication information within a duration, thereby reducing monitoring time of the terminal device, and improving a monitoring efficiency of the terminal device.

Combining with the first aspect, in some implementations of the first aspect, the starting, by a terminal device, a preconfigured timer includes: in a case that a trigger threshold of the timer is reached, starting, by the terminal device, the timer.

By setting a trigger threshold, it is possible to control the starting of the timer flexibly, and thus making it possible to control the time that the terminal device starts to monitor the resource preemption indication information flexibly.

Combining with the first aspect, in some implementations of the first aspect, the method further includes: receiving, by the terminal device, first indication information transmitted by the network device, where the first indication information is used to configure the trigger threshold of the timer.

The trigger threshold of the timer can be dynamically configured through the indication information. Furthermore, in the process of the communication, when a requirement cannot be satisfied by a previously configured trigger threshold, a new trigger threshold of the timer can be configured through the indication information.

Combining with the first aspect, in some implementations of the first aspect, the trigger threshold of the timer is that the terminal device starts demodulating a downlink control signaling, and the in a case that a trigger threshold of the timer is reached, starting, by the terminal device, the timer includes: starting, by the terminal device, the timer when the terminal device begins to demodulate the downlink control signaling.

Combining with the first aspect, in some implementations of the first aspect, the trigger threshold of the timer is that time of the terminal device receiving downlink data exceeds a preset time, the in a case that a trigger threshold of the timer is reached, starting, by the terminal device, the timer includes: starting, by the terminal device, the timer when the time of the terminal device receiving the downlink data exceeds the preset time.

Combining with the first aspect, in some implementations of the first aspect, the method further includes: receiving, by the terminal device, second indication information from the network device, where the second indication information is used to indicate the duration of the timer.

The duration of the timer can be flexibly configured through indication information. For instance, the network device can configure an initial duration for the timer through second indication information, next, the network device may transmit second indication information to the terminal device again according to the situation that how an eMBB resource of the terminal device is preempted, so as to configure a new duration for the timer.

Combining with the first aspect, in some implementations of the first aspect, the method further includes: receiving, by the terminal device, third indication information transmitted by the network device, where the third indication information is used to indicate a location of a target frequency monitoring area in a system frequency resource area.

A location of a target monitoring area can be flexibly configured through third indication information. When the location of the target monitoring area needs to be changed, a new target monitoring area can be configured by transmitting third indication information again.

Combining with the first aspect, in some implementations of the first aspect, the method further includes: in a case that the resource preemption indication information is monitored by the terminal device in the target frequency monitoring area, determining, by the terminal device, a first resource preempted by the other traffic in the eMBB resource of the terminal device according to the resource preemption indication information.

After the resource preemption indication information is monitored by the terminal device, the terminal device can determine a preempted eMBB resource, so that an avoiding measure can be made by the terminal device. For example, the terminal device does not demodulate data of eMBB traffic received on the preempted eMBB resource, so as to avoid demodulation errors.

Combining with the first aspect, in some implementations of the first aspect, the resource preemption indication information is further used to indicate traffic information of the other traffic, the method further includes: demodulating, by the terminal device, data of the eMBB traffic received in the first resource according to the traffic information of the other traffic.

The terminal device can perform a relatively reliable demodulation of data of the eMBB traffic by referring to the traffic information of the other traffic. This is because after the terminal device knows that an eMBB resource is preempted by which traffic, it can determine the impact of such traffic on the eMBB traffic, and in turn make it possible to demodulate the data of the eMBB traffic by referring to the impact of such traffic on the eMBB traffic.

Combining with the first aspect, in some implementations of the first aspect, the traffic information includes at least one of a data transmission format, a modulation and coding scheme, and power information of transmitted data of the other traffic.

Combining with the first aspect, in some implementations of the first aspect, the resource preemption indication information is used to indicate an area where the resource preempted by the other traffic is located.

The resource preemption indication information only needs to use a small number of bits to implement an indication of a preempted resource, thereby saving signaling overheads.

Combining with the first aspect, in some implementations of the first aspect, the resource preemption indication information is used to indicate a time-frequency resource block included in the resource preempted by the other traffic.

The resource preemption indication information can directly indicate which time-frequency resource block is included in a preempted resource, enabling accurate indication of the preempted resource.

Combining with the first aspect, in some implementations of the first aspect, the target frequency monitoring area is outside a resource area where the eMBB resource is located.

Combining with the first aspect, in some implementations of the first aspect, the target frequency monitoring area is within a resource area where the eMBB resource is located.

Combining with the first aspect, in some implementations of the first aspect, the terminal device restarts the timer, and the terminal device monitors resource preemption indication information transmitted by the network device in the target frequency monitoring area again within the duration of the timer.

Combining with the first aspect, in some implementations of the first aspect, the terminal device transmits at least one of traffic information, capability information, and buffer information of the terminal device to the network device.

A second aspect provides a communication method, the method includes: determining, by a network device, resource preemption indication information, where the resource preemption indication information is used to indicate a resource preempted by other traffic in an evolved mobile broadband service (eMBB) resource, the eMBB resource is a time-frequency resource used to schedule eMBB traffic, the other traffic is different from the eMBB traffic; and transmitting, by the network device, the resource preemption indication information to a terminal device on a frequency domain resource of a target frequency monitoring area within a duration of a timer preconfigured for the terminal device.

The other traffic may be traffic that requires low latency communication, for example, URLLC traffic.

The network device transmits resource preemption indication information to the terminal device in the target frequency monitoring area within the duration of the timer, so that the terminal device can determine that an eMBB resource is preempted by the other traffic after receiving the resource preemption indication information, and thus make an avoidance measure. Furthermore, since the network device only transmits the resource preemption indication information within the duration, which indirectly reduces monitoring time of the terminal device and improves monitoring efficiency of the terminal device.

Combining with the second aspect, in some implementations of the second aspect, the method further includes: transmitting, by the network device, first indication information to the terminal device, where the first indication information is used to indicate a trigger threshold of the timer.

By using the first indication information, the network device can configure the trigger threshold of the timer for the terminal device flexibly.

Combining with the second aspect, in some implementations of the second aspect, the trigger threshold of the timer is that the terminal device starts demodulating a downlink control signaling.

Combining with the second aspect, in some implementations of the second aspect, the trigger threshold of the timer is that time of the terminal device receiving downlink data exceeds a preset time.

Combining with the second aspect, in some implementations of the second aspect, the method further includes: transmitting, by the network device, second indication information to the terminal device, where the second indication information is used to indicate the duration of the timer.

By using indication information, the network device can configure the duration of the timer flexibly. Specifically, the network device can configure an initial duration for the timer through second indication information, next, the network device may transmit second indication information to the terminal device again according to the situation that how an eMBB resource of the terminal device is preempted, so as to configure a new duration for the timer.

Combining with the second aspect, in some implementations of the second aspect, the method further includes: transmitting, by the network device, third indication information to the terminal device, where the third indication information is used to indicate a location of a target frequency monitoring area in a system frequency resource area.

By using the third indication information, the network device can configure the location of the target monitoring area flexibly. When the location of the target monitoring area needs to be changed, the network device can configure a new target monitoring area by transmitting the third indication information again.

Combining with the second aspect, in some implementations of the second aspect, the resource preemption indication information is further used to indicate traffic information of the other traffic.

Combining with the second aspect, in some implementations of the second aspect, the traffic information includes at least one of a data transmission format, a modulation and coding scheme, and power information of transmitted data of the other traffic.

Combining with the second aspect, in some implementations of the second aspect, the resource preemption indication information is used to indicate an area where the resource preempted by the other traffic is located.

Combining with the second aspect, in some implementations of the second aspect, the resource preemption indication information is used to indicate a time-frequency resource block included in the resource preempted by the other traffic.

Combining with the second aspect, in some implementations of the second aspect, the target frequency monitoring area is outside a resource area where the eMBB resource is located.

Combining with the second aspect, in some implementations of the second aspect, the target frequency monitoring area is within a resource area where the eMBB resource is located.

A third aspect provides a terminal device, including a module for performing the method according to the first aspect or various implementations thereof.

A fourth aspect provides a network device, including a module for performing the method according to the second aspect or various implementations thereof.

A fifth aspect provides a computer readable medium, the computer readable medium stores a program code for being executed by a terminal device, the program code includes instructions for performing the method according to the first aspect or various implementations thereof.

A sixth aspect provides a computer readable medium, the computer readable medium stores a program code for being executed by a network device, the program code includes instructions for performing the method according to the second aspect or various implementations thereof.

A seventh aspect provides a system chip, where the system chip includes an input interface, an output interface, a processor, and a memory, the processor is configured to perform a code in the memory, and when the code is executed, the processor can implement the method according to the first aspect and various implementations described above.

An eighth aspect provides a system chip, the system chip includes an input interface, an output interface, a processor, and a memory, the processor is configured to perform a code in the memory, and when the code is performed, the processor can implement the method according to the second aspect and various implementations described above.

DETAILED DESCRIPTION OF THE EMBODIMENTS

The technical solutions in embodiments of the present application are described below with reference to the accompanying drawings of the embodiments of the present application.

The technical solutions of the embodiments of the present application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system or a 5G system in future, etc.

Figure 1:
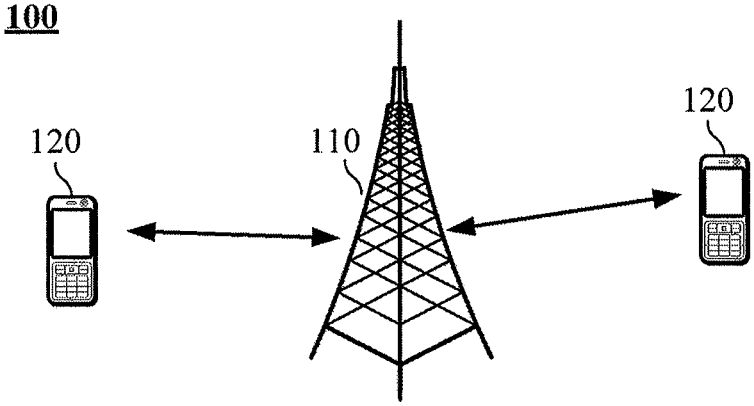
FIG. 1 is a schematic diagram of a possible application scenario according to an embodiment of the present application.

FIG. 1 shows a wireless communication system 100 to which an embodiment of the present application is applied. The wireless communication system 100 may include a network device 110. The network device 110 may be a device that communicates with a terminal device. The network device 110 can provide communication coverage for a specific geographic area and can communicate with a terminal device (e.g., an UE) located within the coverage area. In an implementation, the network device 110 may be a base transceiver station (BTS) in a GSM system or a CDMA system, or may be a nodeB (NB) in a WCDMA system, or may be an Evolutional Node B (eNB or eNodeB) in an LTE system, or may be a wireless controller in a cloud radio access network (CRAN), or a relay station, an access point, an in-vehicle device, a wearable device, a network side device in a future 5G network, or a network device in a future evolved public land mobile network (PLMN) and the like.

The wireless communication system 100 further includes at least one terminal device 120 located in the coverage range of the network device 110. The terminal device 120 may be mobile or fixed. In an implementation, the terminal device 120 may refer to an access terminal, a user equipment (UE), a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a wireless communication capability, a computing device with a wireless communication capability or other processing device connected to a wireless modem, an in-vehicle device, a wearable device, a terminal device in a future 5G network, or a terminal device in a future evolved PLMN etc.

In an implementation, a 5G system or network can also be called a new radio (NR) system or network.

Figure 2:
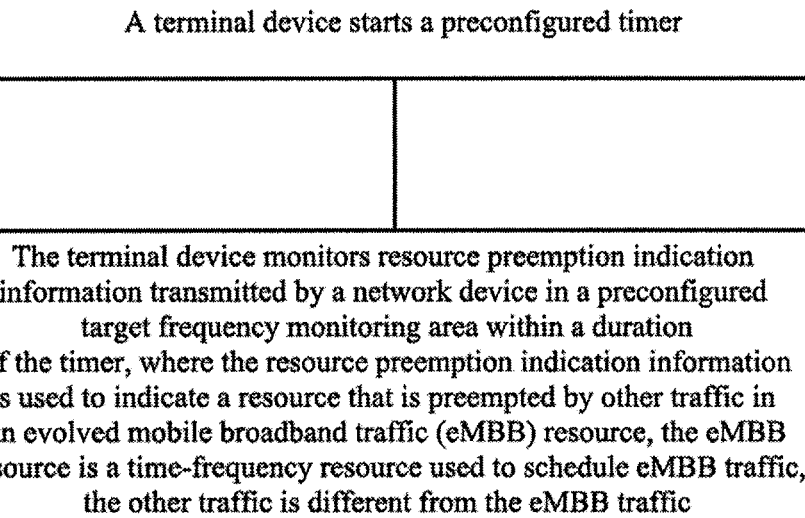
FIG. 2 is a schematic flowchart of a communication method according to an embodiment of the present application.

FIG. 2 is a schematic flowchart of a communication method according to an embodiment of the present application. The method 200 in the FIG. 2 includes:

210: a terminal device starts a preconfigured timer.

The timer may be preconfigured for the terminal device by a network device. For example, the timer may be configured for the terminal device by the network device before transmitting resource preemption indication information to the terminal device.

In an implementation, the terminal device may start the timer in a case that a trigger threshold of the timer is reached.

The trigger threshold of the timer may be determined by receiving indication information transmitted by the network device. Specifically, the terminal device receiving first indication information transmitted by the network device, where the first indication information is used to configure the trigger threshold of the timer.

Furthermore, the trigger threshold of the timer may also be configured by the network device when configuring the timer for the terminal device, or the network device may configure an initial trigger threshold for the timer when configuring the timer for the terminal device, and then, the network device may configure a new trigger threshold for the terminal device through new indication information.

In an implementation, the trigger threshold of the timer may be a time trigger threshold or an event trigger threshold. The time trigger threshold means that the terminal device starts a timer upon a certain amount of time being reached, where the event trigger threshold means that the terminal device may also start the timer after a specific event occurs.

Specifically, the trigger threshold of the timer may be that the terminal device starts demodulating a downlink control signaling (which is transmitted by the network device). That is, the timer is started when the terminal device begins to demodulate the downlink control signaling. Or, the trigger threshold of the timer may also be that the terminal device demodulates the downlink control signaling successfully, that is, the timer is started if the downlink control signaling is demodulated by the terminal device successfully.

The trigger threshold of the timer may also be that the terminal device starts demodulating the Nth (N being an integer greater than or equal to 1) data symbol. The timer may also be started when the terminal device begins to demodulate the Nth data symbol.

Furthermore, the trigger threshold of the timer may also be that time of the terminal device receiving the downlink data exceeds a preset time. The timer may also be started by the terminal device when the time of the terminal device receiving the downlink data exceeds the preset time.

The time of the terminal device receiving the downlink data exceeding the preset time may be that the time from starting receiving the downlink data by the terminal device to receiving the downlink data by the terminal device exceeds the present time.

There may be one or more timers, that is, the network device may configure one or more timers for one terminal device. When there are multiple timers, starting time points of the multiple timers may be different.

Figure 3:
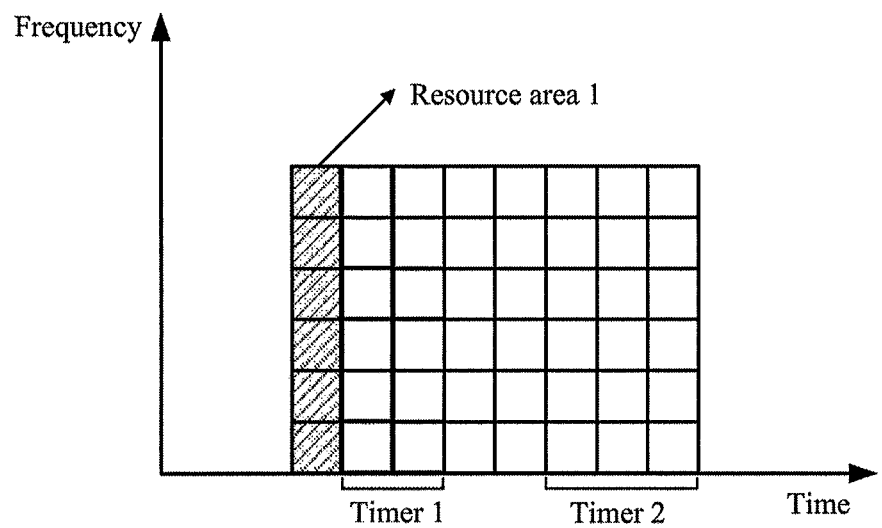
FIG. 3 is a schematic diagram of a timer according to an embodiment of the present application.

As shown in FIG. 3, the terminal device is preconfigured with two timers, which are Timer 1 and Timer 2, respectively. A starting time point of Timer 1 is earlier than a starting time point of Timer 2, where a duration of Timer 1 is two time domain units, and a duration of Timer 2 is three time domain units. When the downlink control information is demodulated by the terminal device successfully, the trigger threshold of Timer 1 is triggered, and Timer 1 is started by the terminal device. When the downlink control information is demodulated by the terminal device successfully and four time domain units have elapsed, Timer 2 is triggered, and Timer 2 is started by the terminal device.

220: the terminal device monitors resource preemption indication information transmitted by a network device in a preconfigured target frequency monitoring area within a duration of the timer, where the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic.

The other traffic may be traffic that requires low latency communication, for example, URLLC traffic.

When the terminal device is a terminal device that has both URLLC traffic and eMBB traffic, the URLLC traffic of the terminal device can preempt an eMBB resource pre-allocated to the eMBB traffic of the terminal device to perform data transmission of the URLLC traffic.

The duration of the timer may be the length of time from the start of the timer to the expiration of the timer, that is, the terminal device monitors the resource preemption indication information after the timer is started, and the terminal device doesn't stop monitoring the resource preemption indication information until the timer expires.

In an implementation, the terminal device may receive second indication information transmitted by the network device, and determine the duration of the timer according to the second indication information, where the second indication information is used to indicate the duration of the timer.

That is, the network device may configure the duration of the timer for the terminal device by using the second indication information.

In an implementation, the terminal device may receive third indication information transmitted by the network device, and determine a target frequency monitoring area according to the third indication information, where the third indication information is used to indicate a location of the target frequency monitoring area in a system frequency resource area.

In an implementation, the method 200 of FIG. 2 further includes: the terminal device restarts the timer, and the terminal device monitors resource preemption indication information transmitted by the network device in the target frequency monitoring area again within the duration of the timer.

In some cases, the terminal device needs to restart the timer, and monitors resource preemption indication information again within a time range of counting of the timer.

For example, if the duration of the timer is 2 ms, the terminal device starts to receive the resource preemption indication information when counting time is about to reach 2 ms; however, since the counting time of the timer is about to reach 2 ms, the terminal device may not receive the resource preemption indication information successfully. In order to ensure that the terminal device can receive the resource preemption indication information, the terminal device needs to restart the timer to achieve successful receiving of the resource preemption indication information.

Furthermore, in some cases, after the terminal device receives the resource preemption indication information, which indicates that the eMBB resource of the terminal device is to be preempted, at this time, the eMBB resource of the terminal device is more likely to be preempted by other traffic, therefore, the terminal device may also receive other resource preemption indication information. In order to ensure that the terminal device can receive resource preemption indication information of the other device, the terminal device also needs to restart the timer to continue to monitor the resource preemption indication information.

It should be understood that the target frequency monitoring area corresponds to a timer, and each timer corresponds to a target frequency monitoring area, where target frequency monitoring areas corresponding to different timers may be the same or different. Furthermore, the target frequency monitoring area may be located in a resource area where an eMBB scheduled resource is located, or may be a resource area where a resource other than the eMBB scheduled resource is located.

In addition, the target frequency monitoring area is only an area where the terminal device receives the resource preemption indication information, and the target frequency monitoring area is generally different from an area where a resource of the terminal device is ultimately preempted by other traffic.

Figure 4:
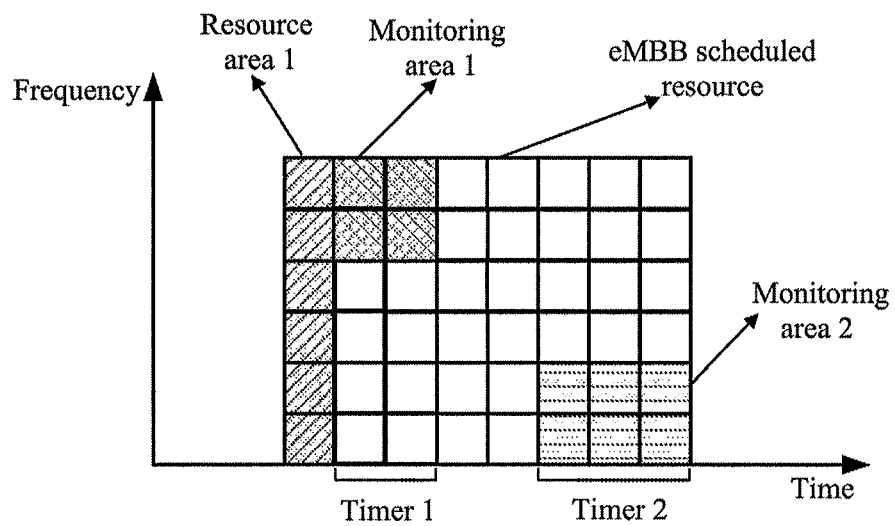
FIG. 4 is a schematic diagram of a timer and a monitoring area according to an embodiment of the present application.

As shown in FIG. 4, the terminal device is configured with Timer 1 and Timer 2, a resource area 1 is an area where the time-frequency resource in which the terminal device receives the downlink control information is located. After the terminal device successfully demodulates the downlink control information, Timer 1 is started, and after the terminal device successfully demodulates the downlink control information and four time domain units have elapsed, Timer 2 is started. Timer 1 corresponds to a monitoring area 1, Timer 2 corresponds to a monitoring area 2, and the monitoring area 1 and the monitoring area 2 are both located in an area where the eMBB scheduled resource is located.

Figure 5:
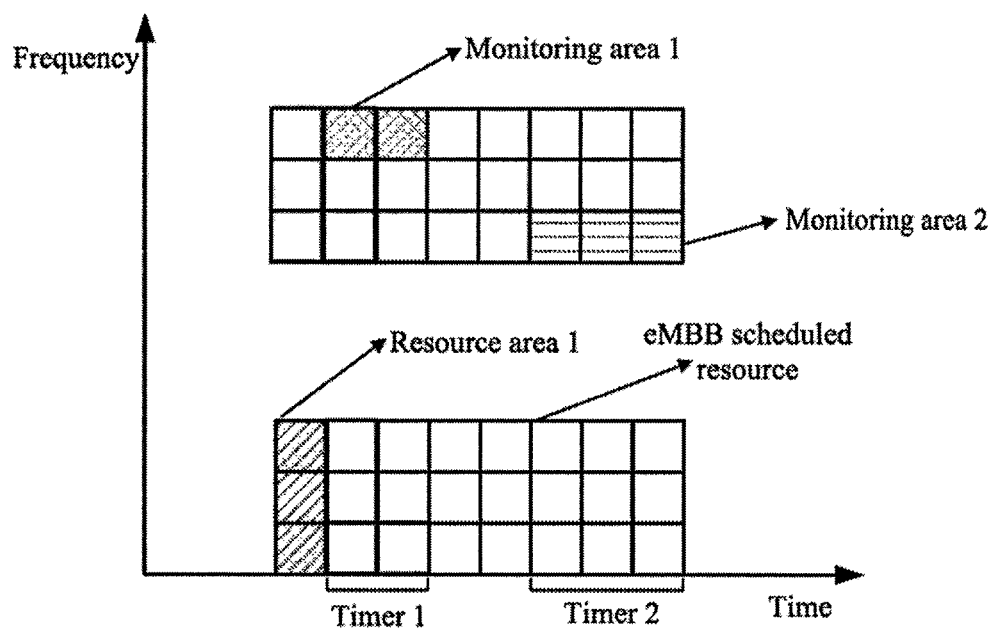
FIG. 5 is a schematic diagram of a timer and a monitoring area according to an embodiment of the present application.

Comparing with FIG. 4, trigger thresholds of two timers in FIG. 5 are the same as in FIG. 4, but a monitoring area 1 corresponding to Timer 1 and a monitoring area 2 corresponding to Timer 2 are located in a resource area where a resource other than the eMBB scheduled resource is located.

It should be understood that the corresponding relationships between timers and monitoring areas in FIG. 4 and FIG. 5 are only two specific cases, in fact, a monitoring area corresponding to Timer 1 and a monitoring area corresponding to Timer 2 may also be located in an area where the eMBB scheduled resource is located and outside the area where the eMBB scheduled resource is located, respectively.

According to the embodiment of the present application, a terminal device can determine whether an eMBB resource of the terminal device is preempted by other traffic by monitoring resource indication information in a duration of a timer, so that an avoiding measure can be made by the terminal device in a case that an eMBB resource is preempted. Furthermore, the terminal device only monitors indication information within a duration, thereby reducing monitoring time of the terminal device, and improving a monitoring efficiency of the terminal device.

As an implementation, the terminal device transmits at least one of traffic information, capability information, and buffer information of the terminal device to the network device.

The traffic information may be information indicating a traffic type of the terminal device, the capability information may be information indicating a capability of the terminal device to process data, and the buffer information may be information indicating a buffer size of the terminal device.

After receiving information of a plurality of terminal devices, the network device can prioritize the plurality of terminals. For example, a terminal device having both eMBB traffic and URLLC traffic has a lower priority, and a terminal device having only eMBB traffic has a higher priority, a terminal device with a strong capability of data processing has a higher priority, and a terminal device with a smaller buffer has a higher priority.

For a terminal device with a higher priority, an impact of an eMBB resource being preempted on the terminal device is relatively small, therefore, after receiving a URLLC traffic request, the network device will allocate an eMBB resource of a terminal device with a higher priority to the URLLC traffic.

The network device preferentially configures a timer and a monitoring area corresponding to the timer for a terminal device with a higher priority, therefore, after receiving a URLLC traffic request, the network device can transmit resource preemption indication information to a terminal device that has been configured with a timer on a frequency domain resource included in a monitoring area within a counting time range of the timer, according to the timer and the monitoring area corresponding to the timer that are preconfigured for the terminal device.

As an implementation, the method 200 of FIG. 2 further includes:

When resource preemption indication information is monitored by the terminal device in a target frequency monitoring area, the terminal device determines a first resource preempted by other traffic in an eMBB resource of the terminal device according to the resource preemption indication information.

After resource preemption indication information is monitored by the terminal device, the terminal device can determine a preempted eMBB resource, so that an avoiding measure can be made by the terminal device. For example, the terminal device does not demodulate data of eMBB traffic received on the preempted eMBB resource, so as to avoid demodulation errors.

Figure 6:
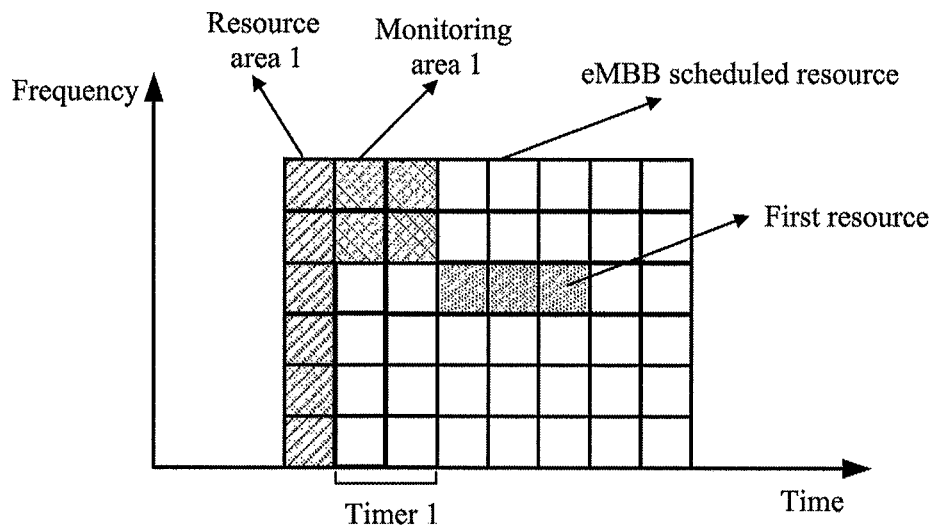
FIG. 6 is a schematic diagram of a timer and a monitoring area according to an embodiment of the present application.

As shown in FIG. 6, taking a Timer 1 as an example, a monitoring area 1 corresponding to Timer 1 is located within an area where an eMBB scheduled resource is located, after resource preemption indication information transmitted by the network device is monitored by the terminal device in the monitoring area, the terminal device determines a first resource that is preempted according to the resource preemption indication information, an area where the first resource is located is as shown in FIG. 6.

As an implementation, the above mentioned resource preemption indication information is further used to indicate traffic information of other traffic. The method 200 of FIG. 2 further includes: the terminal device demodulates data of eMBB traffic received in the first resource according to the traffic information of the other traffic.

The traffic information of the other traffic may include at least one of a data transmission format, a modulation and coding scheme, and power information of transmitted data of the other traffic.

In an implementation, when the resource preemption indication information indicates a resource preempted by other traffic in an eMBB resource, it may only indicate an area where the resource preempted by the other traffic is located. In this way, the resource preemption indication information only needs to use a small number of bits to achieve an indication of a preempted resource, thereby saving signaling overheads.

In an implementation, when the resource preemption indication information indicates a resource preempted by other traffic in an eMBB resource, it may also indicate a time-frequency resource block included in the resource preempted by the other traffic directly. That is, the resource preemption indication information indicates which time-frequency resource block is included in the resource preempted by the other traffic directly, thereby a resource of the terminal device preempted by the other traffic can be indicated more accurately, so that a reasonable avoidance measure can be made by the terminal device according to the preempted resource.

In an implementation, the above mentioned target frequency monitoring area may be located within a resource area where an eMBB resource is located or outside the resource area where the eMBB resource is located.

The communication method according to embodiments of the present application has been described in detail from the perspective of a terminal device with reference to FIG. 2 to FIG. 6, in the following, a communication method according to an embodiment of the present application is described from the perspective of a network device with reference to FIG. 7. It should be understood that the communication method according to an embodiment of the present application that is described from the perspective of the network device, is corresponding to the communication method according to embodiments of the present application that is described from the perspective of the terminal device in FIG. 2 to FIG. 6, repeated description is omitted as appropriate below for the sake of brevity.

Figure 7:
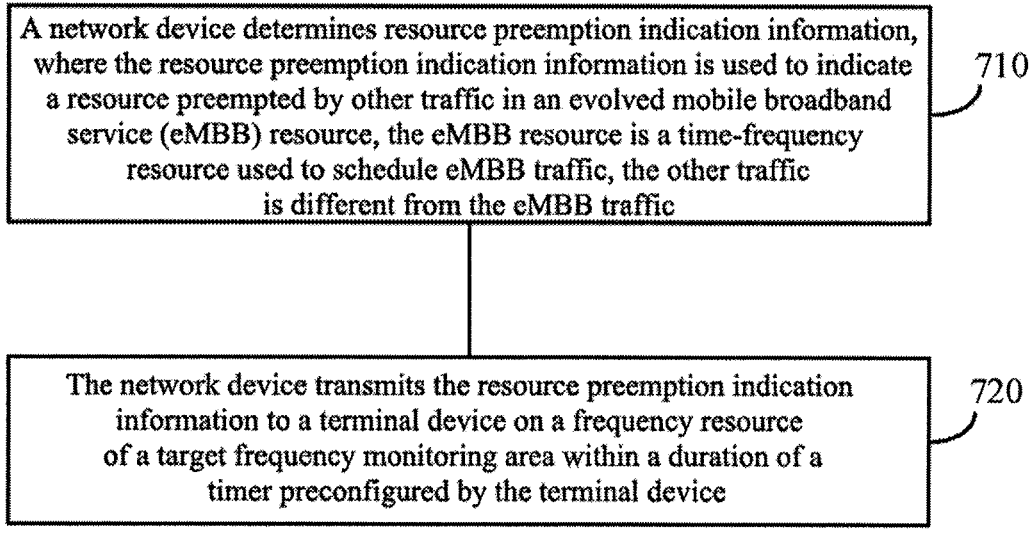
FIG. 7 is a schematic flowchart of a communication method according to an embodiment of the present application.

FIG. 7 is a schematic flowchart of a communication method according to an embodiment of the present application. The method 700 of FIG. 7 includes:

710: a network device determines resource preemption indication information, where the resource preemption indication information is used to indicate a resource preempted by other traffic in an evolved mobile broadband service (eMBB) resource, the eMBB resource is a time-frequency resource used to schedule eMBB traffic, the other traffic is different from the eMBB traffic;

720: the network device transmits the resource preemption indication information to a terminal device on a frequency domain resource of a target frequency monitoring area within a duration of a timer preconfigured for the terminal device.

In the embodiment of the present application, the network device transmits resource preemption indication information to the terminal device in the target frequency monitoring area within the duration of the timer, so that the terminal device can determine that an eMBB resource is preempted by the other traffic after receiving the resource preemption indication information, and thus make an avoidance measure. Furthermore, since the network device only transmits the resource preemption indication information within the duration, which indirectly reduces monitoring time of the terminal device and improves monitoring efficiency of the terminal device.

As an implementation, the method 700 of FIG. 7 further includes: the network device transmits first indication information to the terminal device, where the first indication information is used to indicate the trigger threshold of the timer.

As an implementation, the trigger threshold of the timer is that the terminal device starts demodulating a downlink control signaling.

As an implementation, the trigger threshold of the timer is that time of the terminal device receiving downlink data exceeds a preset time.

As an implementation, the method further includes: the network device transmits second indication information to the terminal device, where the second indication information is used to indicate the duration of the timer.

As an implementation, the method 700 of FIG. 7 further includes: the network device transmits third indication information to the terminal device, where the third indication information is used to indicate a location of a target frequency monitoring area in a system frequency resource area.

As an implementation, the resource preemption indication information is further used to indicate traffic information of the other traffic.

As an implementation, the traffic information includes at least one of a data transmission format, a modulation and coding scheme, and power information of transmitted data of the other traffic.

As an implementation, the resource preemption indication information is used to indicate an area where the resource preempted by the other traffic is located.

As an implementation, the resource preemption indication information is used to indicate a time-frequency resource block included in the resource preempted by the other traffic.

As an implementation, the target frequency monitoring area is outside a resource area where the eMBB resource is located.

As an implementation, the target frequency monitoring area is within a resource area where the eMBB resource is located.

The communication method according to the embodiment of the present application has been described in detail with reference to FIG. 2 to FIG. 7, a terminal device and a network device according to an embodiment of the present application will be described below with reference to FIG. 8 to FIG. 11.

It should be understood that the terminal device and the network device described in FIG. 8 to FIG. 11 can implement respective steps of the communication methods described in FIG. 2 to FIG. 7, repeated description is omitted as appropriate for the sake of brevity.

Figure 8:
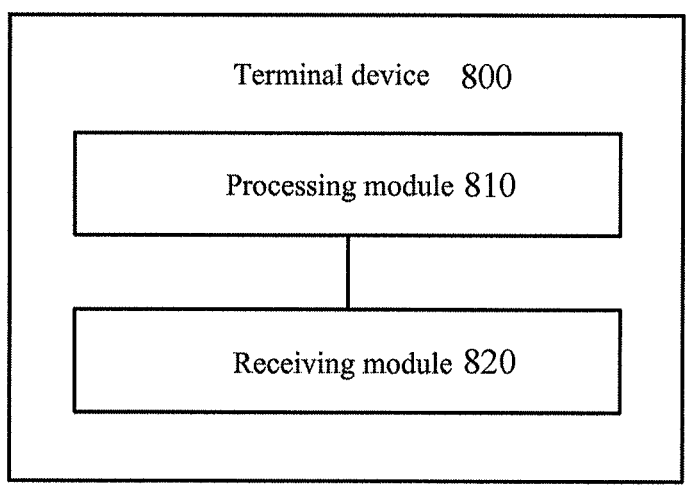
FIG. 8 is a schematic block diagram of a terminal device according to an embodiment of the present application.

FIG. 8 is a schematic block diagram of a terminal device according to an embodiment of the present application. The terminal device 800 of FIG. 8 includes:

a processing module 810, configured to start a preconfigured timer; and a receiving module 820, configured to monitor resource preemption indication information transmitted by a network device in a preconfigured target frequency monitoring area within a duration of the timer, where the resource preemption indication information is used to indicate a resource that is preempted by other traffic in an eMBB resource, the eMBB resource is a time-frequency resource used to schedule eMBB traffic, the other traffic is different from the eMBB traffic.

As an implementation, the processing module 810 is specifically configured to: start the timer in a case that a trigger threshold of the timer is reached.

As an implementation, the receiving module 820 is further configured to: receive first indication information transmitted by the network device, where the first indication information is used to configure the trigger threshold of the timer.

As an implementation, the trigger threshold of the timer is that the terminal device 800 starts demodulating a downlink control signaling, the processing module 810 is specifically configured to: start the timer when the terminal device 800 begins to demodulate the downlink control signaling.

As an implementation, the trigger threshold of the timer is that time of the terminal device 800 receiving downlink data exceeds a preset time, the processing module 810 is specifically configured to: start the timer when the time of the terminal device 800 receiving the downlink data exceeds the preset time.

As an implementation, the receiving module 820 is further configured to: receive second indication information from the network device, where the second indication information is used to indicate the duration of the timer.

As an implementation, the receiving module 820 is further configured to: receive third indication information transmitted by the network device, where the third indication information is used to indicate a location of a target frequency monitoring area in a system frequency resource area.

As an implementation, the processing module 810 is specifically configured to: in a case that the resource preemption indication information is monitored in the target frequency monitoring area, determine a first resource preempted by the other traffic in the eMBB resource of the terminal device 800 according to the resource preemption indication information.

As an implementation, the resource preemption indication information is further used to indicate traffic information of the other traffic, the processing module 810 is further configured to: demodulate data of the eMBB traffic received in the first resource according to the traffic information of the other traffic.

As an implementation, the traffic information includes at least one of a data transmission format, a modulation and coding scheme, and power information of transmitted data of the other traffic.

As an implementation, the resource preemption indication information is used to indicate an area where the resource preempted by the other traffic is located.

As an implementation, the resource preemption indication information is used to indicate a time-frequency resource block included in the resource preempted by the other traffic.

As an implementation, the target frequency monitoring area is outside a resource area where the eMBB resource is located.

As an implementation, the target frequency monitoring area is within a resource area where the eMBB resource is located.

Figure 9:
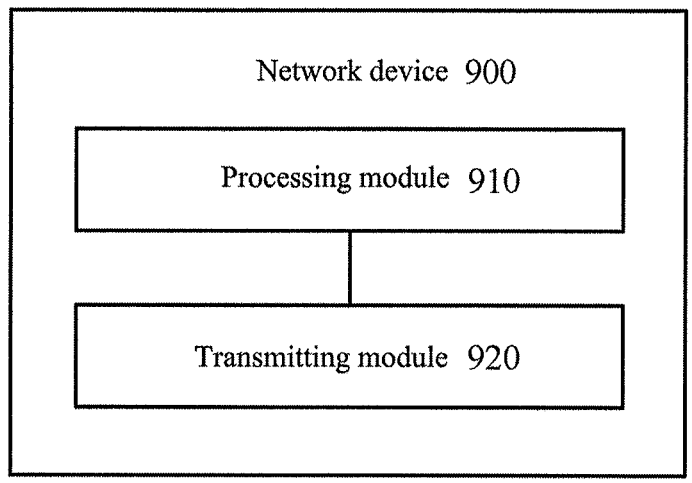
FIG. 9 is a schematic block diagram of a network device according to an embodiment of the present application.

FIG. 9 is a schematic block diagram of a network device according to an embodiment of the present application. The network device 900 of FIG. 9 includes:

a processing module 910, configured to determine resource preemption indication information, where the resource preemption indication information is used to indicate a resource preempted by other traffic in an eMBB resource, the eMBB resource is a time-frequency resource used to schedule eMBB traffic, the other traffic is different from the eMBB traffic; and a transmitting module 920, configured to transmit the resource preemption indication information to a terminal device on a frequency domain resource of a target frequency monitoring area within a duration of a timer preconfigured for the terminal device.

As an implementation, the transmitting module 920 is further configured to: transmit first indication information to the terminal device, where the first indication information is used to indicate a trigger threshold of the timer.

As an implementation, the trigger threshold of the timer is that the terminal device starts demodulating a downlink control signaling.

As an implementation, the trigger threshold of the timer is that time of the terminal device receiving downlink data exceeds a preset time.

As an implementation, the transmitting module 920 is further configured to: transmit second indication information to the terminal device, where the second indication information is used to indicate the duration of the timer.

As an implementation, the transmitting module 920 is further configured to: transmit third indication information to the terminal device, where the third indication information is used to indicate a location of a target frequency monitoring area in a system frequency resource area.

As an implementation, the resource preemption indication information is further used to indicate traffic information of the other traffic.

As an implementation, the traffic information includes at least one of a data transmission format, a modulation and coding scheme, and power information of transmitted data of the other traffic.

As an implementation, the resource preemption indication information used is for indicating an area where the resource preempted by the other traffic is located.

As an implementation, the resource preemption indication information is used to indicate a time-frequency resource block included in the resource preempted by the other traffic.

As an implementation, the target frequency monitoring area is outside a resource area where the eMBB resource is located.

As an implementation, the target frequency monitoring area is within a resource area where the eMBB resource is located.

Figure 10:
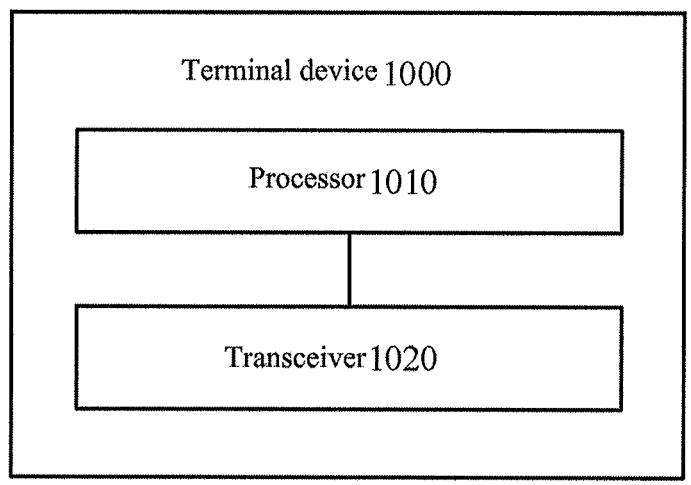
FIG. 10 is a schematic block diagram of a terminal device according to an embodiment of the present application.

FIG. 10 is a schematic block diagram of a terminal device according to an embodiment of the present application. The terminal device 1000 of FIG. 10 includes:

a processor 1010, configured to start a preconfigured timer; and a transceiver 1020, configured to monitor resource preemption indication information transmitted by a network device in a preconfigured target frequency monitoring area within a duration of the timer, where the resource preemption indication information is used to indicate a resource that is preempted by other traffic in an eMBB resource, the eMBB resource is a time-frequency resource used to schedule eMBB traffic, the other traffic is different from the eMBB traffic.

As an implementation, the processor 1010 is specifically configured to: start the timer in a case that a trigger threshold of the timer is reached.

As an implementation, the transceiver 1020 is further configured to: receive first indication information transmitted by the network device, where the first indication information is used to configure the trigger threshold of the timer.

As an implementation, the trigger threshold of the timer is that the terminal device 1000 starts demodulating a downlink control signaling, the processor 1010 is specifically configured to: start the timer when the terminal device 1000 begins to demodulate the downlink control signaling.

As an implementation, the trigger threshold of the timer is that time of the terminal device 1000 receiving downlink data exceeds a preset time, the processor 1010 is specifically configured to: start the timer when the time of the terminal device 1000 receiving the downlink data exceeds the preset time.

As an implementation, the transceiver 1020 is further configured to: receive second indication information from the network device, where the second indication information is used to indicate the duration of the timer.

As an implementation, the transceiver 1020 is further configured to: receive third indication information transmitted by the network device, where the third indication information is used to indicate a location of a target frequency monitoring area in a system frequency resource area.

As an implementation, the processor 1010 is specifically configured to: in a case that the resource preemption indication information is monitored in the target frequency monitoring area, determine a first resource preempted by the other traffic in the eMBB resource of the terminal device 1000 according to the resource preemption indication information.

As an implementation, the resource preemption indication information is further used to indicate traffic information of the other traffic, the processor 1010 is further configured to: demodulate data of the eMBB traffic received in the first resource according to the traffic information of the other traffic.

As an implementation, the traffic information includes at least one of a data transmission format, a modulation and coding scheme, and power information of transmitted data of the other traffic.

As an implementation, the resource preemption indication information is used to indicate an area where the resource preempted by the other traffic is located.

As an implementation, the resource preemption indication information is used to indicate a time-frequency resource block included in the resource preempted by the other traffic.

As an implementation, the target frequency monitoring area is outside a resource area where the eMBB resource is located.

As an implementation, the target frequency monitoring area is within a resource area where the eMBB resource is located.

Figure 11:
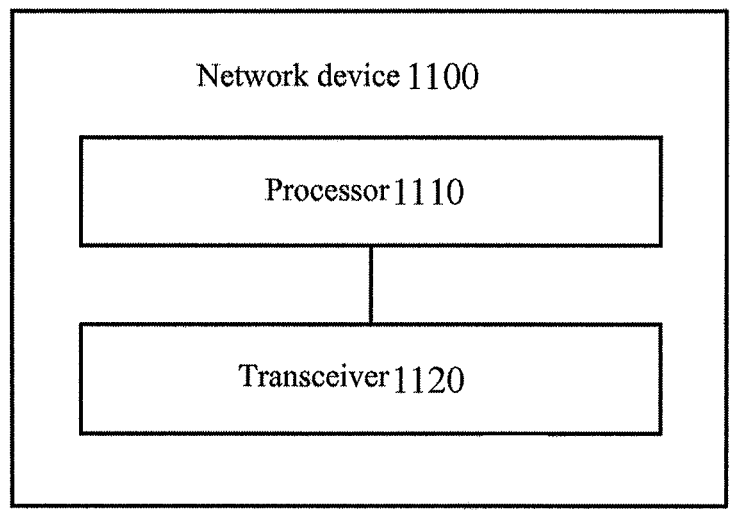
FIG. 11 is a schematic block diagram of a network device according to an embodiment of the present application.

FIG. 11 is a schematic block diagram of a network device according to an embodiment of the present application. The network device 1100 of FIG. 11 includes:

a processor 1110, configured to determine resource preemption indication information, where the resource preemption indication information is used to indicate a resource preempted by other traffic in an eMBB resource, the eMBB resource is a time-frequency resource used to schedule eMBB traffic, the other traffic is different from the eMBB traffic; and a transceiver 1120, configured to transmit the resource preemption indication information to a terminal device on a frequency domain resource of a target frequency monitoring area within a duration of a timer preconfigured for the terminal device.

As an implementation, the transceiver 1120 is further configured to: transmit first indication information to the terminal device, where the first indication information is used to indicate a trigger threshold of the timer.

As an implementation, the trigger threshold of the timer is that the terminal device starts demodulating a downlink control signaling.

As an implementation, the trigger threshold of the timer is that time of the terminal device receiving downlink data exceeds a preset time.

As an implementation, the transceiver 1120 is further configured to: transmit second indication information to the terminal device, where the second indication information is used to indicate the duration of the timer.

As an implementation, the transceiver 1120 is further configured to: transmit third indication information to the terminal device, where the third indication information is used to indicate a location of a target frequency monitoring area in a system frequency resource area.

As an implementation, the resource preemption indication information is further used to indicate traffic information of the other traffic.

As an implementation, the traffic information includes at least one of a data transmission format, a modulation and coding scheme, and power information of transmitted data of the other traffic.

As an implementation, the resource preemption indication information used is for indicating an area where the resource preempted by the other traffic is located.

As an implementation, the resource preemption indication information is used to indicate a time-frequency resource block included in the resource preempted by the other traffic.

As an implementation, the target frequency monitoring area is outside a resource area where the eMBB resource is located.

As an implementation, the target frequency monitoring area is within a resource area where the eMBB resource is located.

Figure 12:
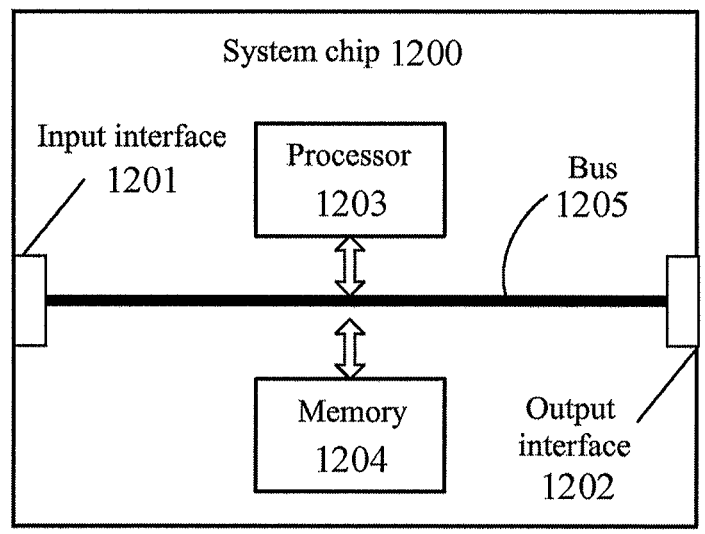
FIG. 12 is a schematic block diagram of a system chip according to an embodiment of the present application.

FIG. 12 is a schematic structural diagram of a system chip according to an embodiment of the present application. The system chip 1200 of FIG. 12 includes an input interface 1201, an output interface 1202, a processor 1203, and a memory 1204 which are connected via a bus 1205, and the processor 1203 is configured to execute a code in the memory 1204.

In an implementation, when the code is executed, the processor 1203 implements a method performed by a terminal device according to the method embodiments. For the sake of brevity, details are not described herein again.

In an implementation, when the code is executed, the processor 1203 implements a method performed by a network device according to the method embodiments. For the sake of brevity, details are not described herein again.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present application.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present application, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present application may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present application, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present application. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the claims.

What is claimed is:

1. A communication method, comprising:
    starting, by a terminal device, a preconfigured timer; and
    monitoring, by the terminal device, resource preemption indication information transmitted by a network device in a preconfigured target frequency monitoring area within a duration of the timer, wherein the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic;
    wherein starting, by the terminal device, the preconfigured timer comprises:
    in a case that a trigger condition of the timer is reached, starting, by the terminal device, the timer;
    wherein the trigger condition of the timer is that time of the terminal device receiving downlink data exceeds a preset time, and the in a case that a trigger condition of the timer is reached, starting, by the terminal device, the timer comprises:
    starting, by the terminal device, the timer when the time of the terminal device receiving the downlink data exceeds the preset time.

2. The method according to claim 1, wherein the method further comprises:
    receiving, by the terminal device, first indication information transmitted by the network device, wherein the first indication information is used to configure the trigger condition of the timer.

3. The method according to claim 1, wherein the method further comprises:
    receiving, by the terminal device, second indication information from the network device, wherein the second indication information is used to indicate the duration of the timer.

4. The method according to claim 1, wherein the method further comprises:
    receiving, by the terminal device, third indication information transmitted by the network device, wherein the third indication information is used to indicate a location of the target frequency monitoring area in a system frequency resource area.

5. The method according to claim 1, wherein the method further comprises:
    in a case that the resource preemption indication information is monitored by the terminal device in the target frequency monitoring area, determining, by the terminal device, a first resource preempted by the other traffic in the eMBB resource of the terminal device according to the resource preemption indication information.

6. The method according to claim 5, wherein the resource preemption indication information is further used to indicate traffic information of the other traffic, the method further comprises:
    demodulating, by the terminal device, data of the eMBB traffic received in the first resource according to the traffic information of the other traffic.

7. The method according to claim 6, wherein the traffic information comprises at least one of a data transmission format, a modulation and coding scheme, and power information of transmitted data of the other traffic.

8. The method according to claim 1, wherein the resource preemption indication information is used to indicate an area where the resource preempted by the other traffic is located.

9. The method according to claim 1, wherein the resource preemption indication information is used to indicate a time-frequency resource block comprised in the resource preempted by the other traffic.

10. A terminal device, comprising:
    a processor, configured to start a preconfigured timer; and
    a transceiver, configured to monitor resource preemption indication information transmitted by a network device in a preconfigured target frequency monitoring area within a duration of the timer, wherein the resource preemption indication information is used to indicate a resource that is preempted by other traffic in an evolved mobile broadband traffic (eMBB) resource, the eMBB resource is a time-frequency resource used to schedule eMBB traffic, the other traffic is different from the eMBB traffic;
    wherein the processor is configured to:
    start the timer in a case that a trigger condition of the timer is reached;
    wherein the trigger condition of the timer is that time of the terminal device receiving downlink data exceeds a preset time, the processor is configured to:
    start the timer when the time of the terminal device receiving the downlink data exceeds the preset time.

11. The terminal device according to claim 10, wherein the transceiver is further configured to:
    receive first indication information transmitted by the network device, wherein the first indication information is used to configure the trigger condition of the timer.

12. The terminal device according to claim 10, wherein the transceiver is further configured to:
receive second indication information from the network device, wherein the second indication information is used to indicate the duration of the timer.

13. The terminal device according to claim 10, wherein the transceiver is further configured to:
receive third indication information transmitted by the network device, wherein the third indication information is used to indicate a location of the target frequency monitoring area in a system frequency resource area.

14. The terminal device according to claim 10, wherein the processor is configured to:
in a case that the resource preemption indication information is monitored in the target frequency monitoring area, determine a first resource preempted by the other traffic in the eMBB resource of the terminal device according to the resource preemption indication information.

15. The terminal device according to claim 14, wherein the resource preemption indication information is further used to indicate traffic information of the other traffic, the processor is further configured to:
demodulate data of the eMBB traffic received in the first resource according to the traffic information of the other traffic.

16. The terminal device according to claim 15, wherein the traffic information comprises at least one of a data transmission format, a modulation and coding scheme, and power information of transmitted data of the other traffic.

17. The terminal device according to claim 10, wherein the resource preemption indication information is used to indicate an area where the resource preempted by the other traffic is located.

18. The terminal device according to claim 10, wherein the resource preemption indication information is used to indicate a time-frequency resource block comprised in the resource preempted by the other traffic.

19. The terminal device according to claim 10, wherein the target frequency monitoring area is outside a resource area where the eMBB resource is located.

20. The terminal device according to claim 10, wherein the target frequency monitoring area is within a resource area where the eMBB resource is located.

* * * * *